(12) United States Patent
Brown

(10) Patent No.: US 7,944,472 B2
(45) Date of Patent: May 17, 2011

(54) SYSTEM AND METHOD FOR STANDARDIZED SPEED-EVALUATION OF ATHLETES

(76) Inventor: Dwayne Tyrone Brown, Austell, GA (US)

(*) Notice: Subject to any disclaimer, the term of this patent is extended or adjusted under 35 U.S.C. 154(b) by 1646 days.

(21) Appl. No.: 11/201,460

(22) Filed: Aug. 10, 2005

(65) Prior Publication Data

US 2006/0036396 A1 Feb. 16, 2006

Related U.S. Application Data

(60) Provisional application No. 60/600,225, filed on Aug. 10, 2004.

(51) Int. Cl.
*H04N 7/18* (2006.01)
(52) U.S. Cl. .......................................................... 348/157
(58) Field of Classification Search .................. None
See application file for complete search history.

(56) References Cited

U.S. PATENT DOCUMENTS

| 5,684,453 A * | 11/1997 | Welch .......................... 473/447 |
| 6,537,076 B2 * | 3/2003 | McNitt et al. .................. 434/252 |
| 6,603,103 B1 * | 8/2003 | Ulrich et al. .................. 250/205 |
| RE38,735 E * | 5/2005 | Yao ............................... 359/256 |
| 2005/0014113 A1 * | 1/2005 | Fleck et al. .................... 434/247 |

* cited by examiner

*Primary Examiner* — Nhon T Diep
(74) *Attorney, Agent, or Firm* — Darnita Akers

(57) ABSTRACT

A system and method for standardized speed-evaluation of athletes that uses a photoelectric sensor configuration to create a laser grid by which an athlete's position over time will be monitored during, and analyzed after a test session. The photoelectric laser sensors are configured to establish the athlete's starting and stopping time along with the integrated synchronized video motion sensing. The athlete's motion is processed and transmitted by both a high-speed motion camera and a secondary test camera installed at specified distances. The secondary camera streams video data to the remote viewers in a wide-angle perspective. The athlete's movement is captured on video and transmitted to remote viewers via internet-streaming.

5 Claims, 5 Drawing Sheets

SYSTEM AND METHOD FOR STANDARDIZED SPEED-EVALUATION OF ATHLETES

CROSS REFERENCE TO RELATED APPLICATIONS

This utility patent application claims rights under 35 U.S.C. 119(e) from U.S. provisional patent application 60/600,225 entitled System and Method for Standardized Speed-Evaluation of Athletes filed Aug. 10, 2004.

BACKGROUND OF THE INVENTION

Currently, there exists no controlled platform by which the speed-performance data for football, baseball, soccer, lacrosse, and other non-Olympic event athletes of all levels can be systematically compared via an interactive, internet-accessible system. The present invention standardizes the current speed-evaluating events used to determine an athlete's comprehensive athletic ability. This system incorporates seven distinct technical areas, of which are high-speed motion detection, integrated analysis, local area network video transmission, photoelectric laser integration, low-level sensor fusion, internet video streaming, and web tele-presence. The system utilizes defined test points within an area of evaluation, along with video documentation, to create an automated universal scale by which speed-performance data can be compared and contrasted, significantly reducing the inclusion of inherent human error and bias.

The present invention evaluates an athlete's speed performance without the use of an external stimulus (i.e. starter's pistol or observation of the pressure sensitivity of starting blocks). This is an improvement over existing timing systems for several reasons. The existing non-track and field pressure-sensitive timing systems do not account for the test surface hardness and provide no universal access to test data. The calibration of the point at which timing of the athlete begins is relevant only to the initial testing surface. If the pressure sensitive pad used in that system is placed on a different surface that is either harder (asphalt, Mondo™ track, or AstroTurf™) or softer (natural grass, or synthetic turf such as FieldTurf™) the force-compression from the athlete to the second surface would differ. In essence, this means that data obtained using a pressure-sensitive time-start methodology is comparable only to that uniquely calibrated pressure-sensitive mechanism and the original test surface.

Additionally, timing systems that utilize the gun-start method seen in many track and field applications cannot provide time data for an athlete that begins the speed-evaluating event from his own determination. There is no quantification of the starting time for pressure track blocks systems when the athlete is in the start position and creating initial thrust without the aid of track starting blocks. The current method of hand-timing the start and/or stop introduces three distinct internal error sources. One, the innate human reaction time of no less than 0.11 seconds of movement to perception of stimulus time lag. Second, the time necessary for the perception of movement to produce a physical action attempting to accurately quantify the start of the athlete. And third, the enumeration of the physical action varies depending on the particular stopwatches and which finger the timer uses to create the start and finish test time-points.

With the above factors in consideration, the perception of the athlete's start is relative to the timer's distance and viewing angle. An average well-conditioned athlete will complete a sprinting event with an average speed of 8.800 yards per second (i.e. completing a 40-yard sprint in 4.550 seconds). A timer must accurately perceive the athlete at said speed at the precise time that he enters a defined plane to establish the stop time. All of these variables are to be taken into account when hundredths of seconds make significant athlete-evaluation differences. These variables become even more of a hindrance to precision and consistency when speed-evaluation data is compared from two or more sources given the low probability of two human beings timing the same or separate sprints in exactly the same manner. The variation increases by several degrees of magnitude if the test format/basis lacks consistent scientific control. Finally, if the data is compared in a 1:1 ratio against values from another test set collected at a separate venue, due to the undefined direct and indirect technical uncertainty of the second data set, the variable, at the very least doubles in inaccuracy.

The time data described above is routinely used to quantify a prospective athlete's overall physical ability. Based on the speed-evaluation methodologies described above, objective decisions about an athlete's future, highly effected by the perceived speed of an athlete, are made based on the culmination of subjective information. For the national colleges and universities, speed data is one of the most significant criteria of interest in recruiting prospective athletes. There is no greater benchmark than the athlete's speed. Colleges and universities invest significant pre-season preparation on increasing an athlete's awareness and overall speed. Having the ability to accurately track the progress and trends of an athlete's speed should be left to scientific measures instead of direct or indirect variable factors.

Professional organizations measure an athlete's speed in three distinct testing methods. First, the 40 yard dash, determines the athletes overall top speed capability. Next, the 3-Cone drill determines the athlete's speed in context of his ability to change directions quickly. Lastly, the Shuttle drills are designed to test the athlete's change-of-direction quickness and endurance. The present invention has the capability to measure an athlete's speed in each of these testing methods.

The creation of an unbiased, precise, accurate and technologically appropriate testing system provides several benefits. It will allow personnel directors of various entities to have confidence in test data not witnessed by their respective agents. The need for extensive travel will be obviated by the existence of a standardized evaluating tool for which visual documentation is also available. The testing system will allow the college recruiter to focus his or her energies on film-study, character evaluation, and other aspects of athlete assessment with the elimination of biased physical evidence of an athlete's physical ability. The system gives confidence to high-school coaches, who are lobbying to further the career of their athletes, that their players are given a fair chance at the opportunities available for qualified athletes.

The system will also give the evaluated athlete the opportunity to view data taken directly from a testing system that is used to measure all of his peers. He no longer has to rely on inconsistent hand-determined and hand-entered data with his professional future hanging in the balance. The system will give personal trainers the platform for which training in the method of final evaluation is no longer a question. Trainers will be able to train their respective athletes in the method consistent to that in which the athlete will be timed in the future. It also provides the trainers video evidence by which to further analyze subtle flaws that escape the human eye. The system also allows scouts the opportunity to view all collegiate workout evaluations, including large and small combines without leaving his office, or even from the golfing range via wireless internet connection. No current system displays similar functionality or architecture.

BRIEF SUMMARY OF THE INVENTION

In the present invention, a photoelectric sensor configuration creates a laser grid by which an athlete's position over time will be monitored during, and analyzed after a test session. The photoelectric laser sensors are configured to establish the athlete's starting and stopping time along with the integrated synchronized video motion sensing. Through a series of user-friendly online options, the end user selects the type of testing desired along with test facility conditions and other factors integral to consistent testing. All options are fully available through the test-system viewing interface or any computing device with Internet access and an applicable web browser.

In this system, the athlete's movement is captured on video and transmitted to remote viewers via internet streaming. The athlete's motion is processed and transmitted by both a high-speed motion camera and secondary test camera installed at a specified distance. The secondary camera streams video data to the remote viewers in a wide-angle perspective. All sensor information is transmitted to the central computing component via wired or wireless infrared, radio frequency, or other means to be reduced, compressed, encrypted, and formatted for wired or wireless transmission to an internet-connected device. The secure data is then transferred to a remote server accessed via the applicable Internet Protocol (IP) address. The data collected is available for the database front-end concentrated analysis, management, and storage applications. All data including playback video analysis is available through the test system information portal via authorized online access.

DESCRIPTION OF THE PREFERRED EMBODIMENT

Figure 1:
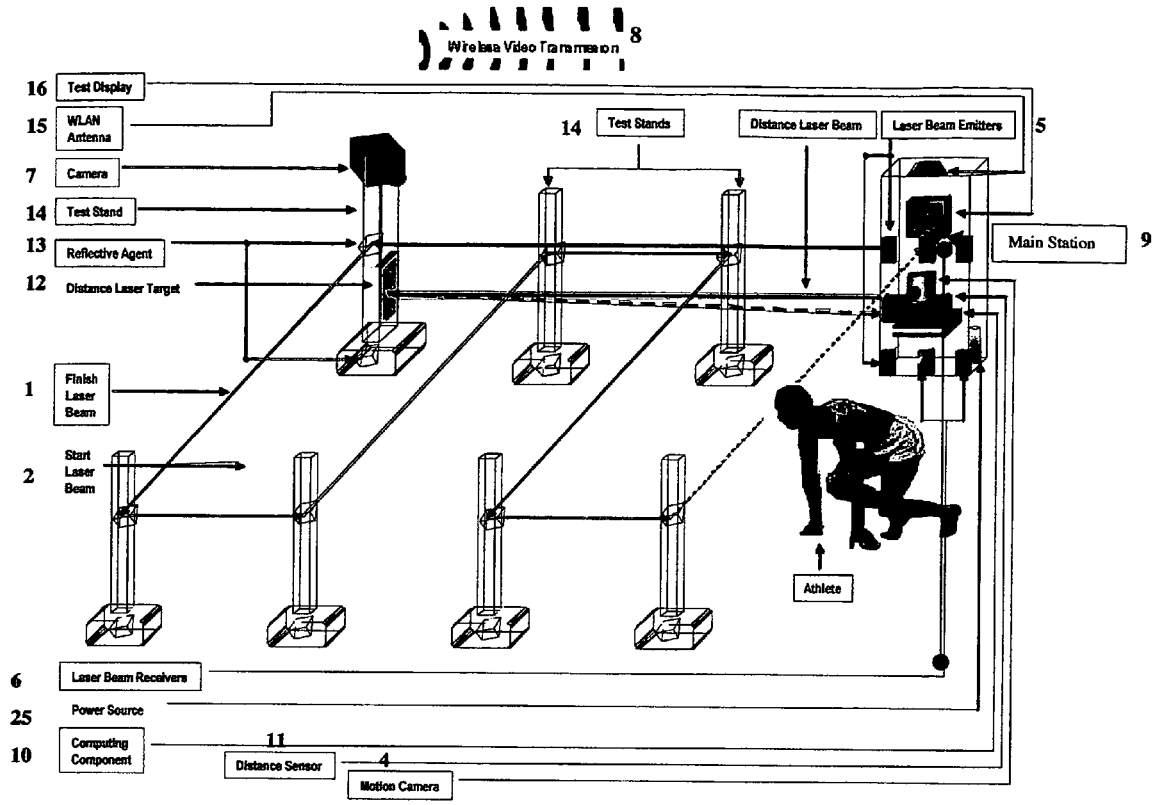
FIG. 1 shows a top-level graphical representation of the system configuration.

As seen in FIG. 1, a photoelectric sensor configuration creates laser grids by which an athlete's position over time will be monitored during, and analyzed after a test session. An integrated high-speed motion camera (4) will analyze and quantify the athlete's motion, which is compared with the data from the positioned laser beam receivers or photoelectric sensors (10) to determine the athlete's speed. A secondary camera (7) is positioned to monitor and provide wide-angle viewing of the testing operations over the entire test distance. The two cameras (7 and 4) are positioned respective to the intermediate "splits" determined by the placement of reflective agents (13) positioned with stands (14) directing the laser beam (1) from its originating transmitters (5) to the applicable sensor receivers (10). This secondary camera (7) has a direct video transfer link (8) to the test system's main station (9). The video from this secondary camera (7) is received via the applicable test system's IP address. Therefore, not only does the high-speed motion camera (4) stream video through the test system and over the Internet via wired or wireless means, but so too does the secondary camera (7) with a wider viewing angle for test observers, administrators, and end users. The distance sensor (11) measures the test distance within 5 mm and reports information throughout the duration of the test session. The incorporation of the distance sensor ensures measurement precision, accuracy and repeatability. The target point (12) is established at the end of the test configuration for continual measurement ensuring test-distance integrity throughout the testing session.

Figure 2:
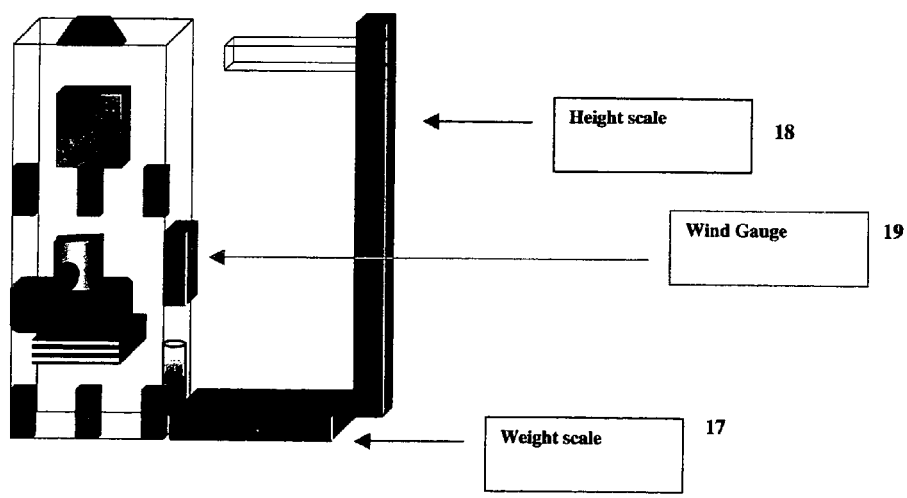
FIG. 2 illustrates the height and weight measurement capabilities including an integrated weight scale (17), height measurement component (18) and wind gauge (19).
Figure 3:
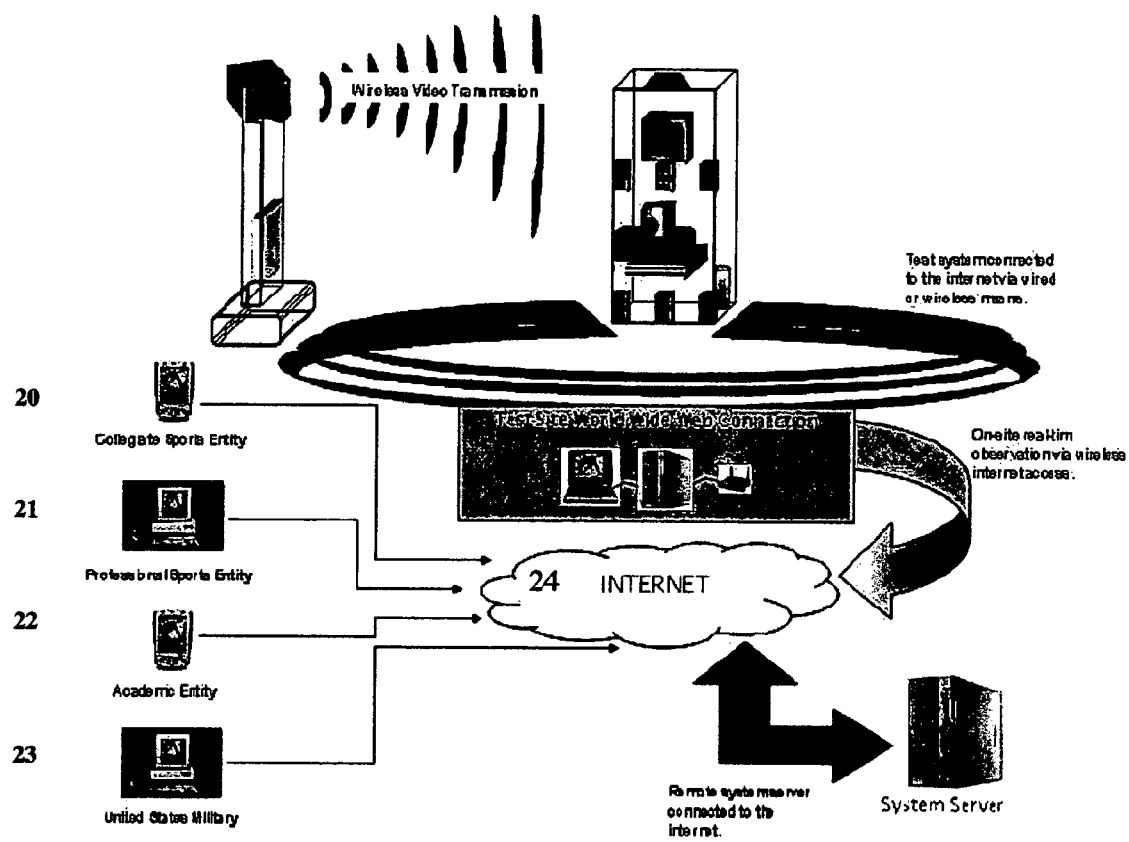
FIG. 3 graphically displays the Internet connectivity functions of the system by depicting the Wireless Local Area Network (WLAN) transmission as spiraling lines to the computing system directly connected to the Internet. Authorized end-users (20, 21, 22, & 23) are shown gaining access to the test system and applicable data through a central web location (24).
Figure 4:
FIG. 4 is a view of the Internet site-opening page with the various sports entities.
Figure 5:
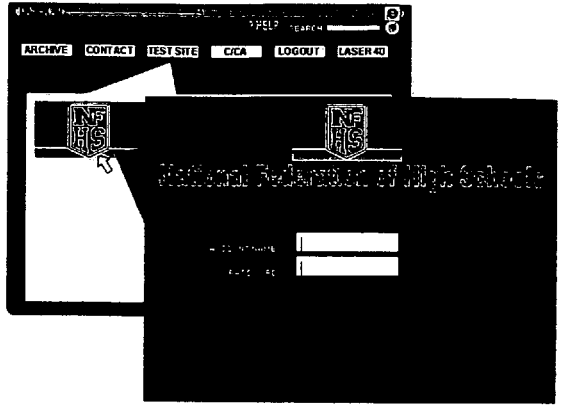
FIG. 5 is a view of the Internet site page prompting user for account and password information.
Figure 6:
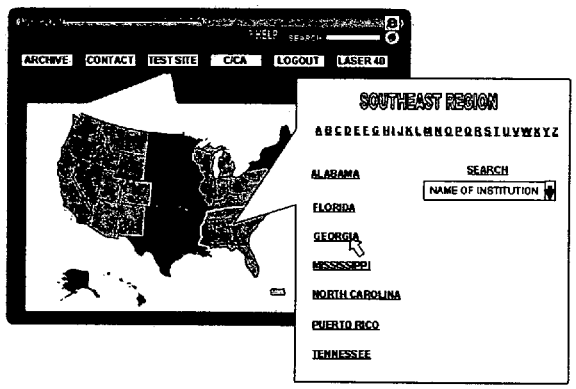
FIG. 6 is a view of the Internet site page with the option for users to choose the geographical location of testing site of interest.
Figure 7:
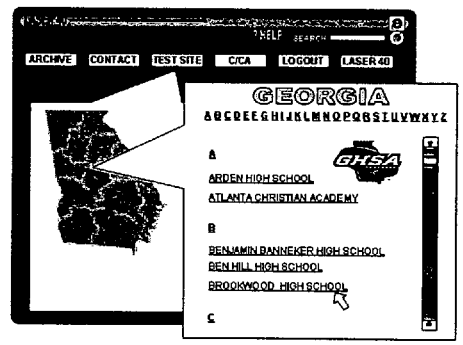
FIG. 7 is a view of the testing sites within the state chosen from FIG. 6.
Figure 8:
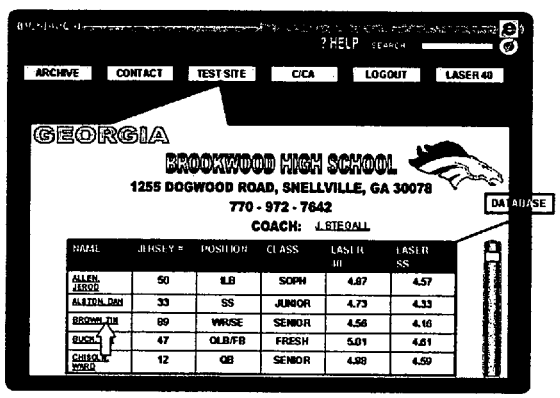
FIG. 8 is a view of the Internet site page displaying preliminary information specific to the testing site chosen in FIG. 7.
Figure 9:
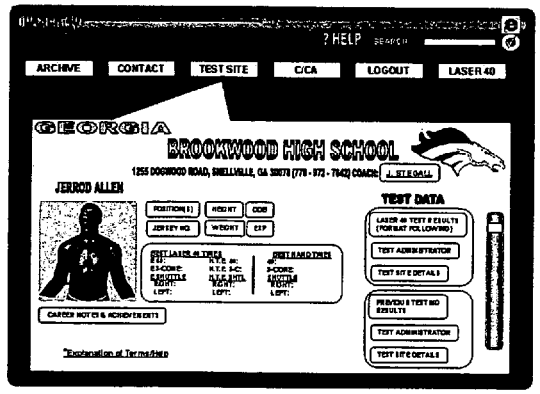
FIG. 9 is a view of the Internet site page of an athlete chosen from FIG. 8.

FIG. 2 shows a digital weight scale (17) and a height measurement component (18), with which the physical measurements of the athlete are taken. This method negates the need for human manual entry of height and weight data. A wind direction and speed gauging component (19) will also be integrated into the system for comparative analysis.

Figure 10:
FIG. 10 is a view of an athlete assuming the expected right-handed three-point stance for sprint testing.

The test session is started when the test administrator logs onto the testing online website, locates the records applicable to the testing session through a series of interactive displays, and activates the testing at a specified remote location via authorized access, as shown in FIGS. 3-9. The test administrator then enters the applicable test conditions into the system. Once the test administrator has readied the system, the athlete enters the testing area, settles into the starting-stance position shown in FIG. 10 and holds the starting-stance position for a pre-determined amount of time. System readiness is defined as Built-In-Test (BIT) data reporting both high-speed and wide-angle camera operation, photoelectric laser beam transmission and sensing at all photoelectric sensors, and successful Internet connection with consistent dual video streaming.

As the athlete starts his sprint on his own determination, the system determines the athlete's start time as follows:

The motion camera's sensing volume is defined by the horizontal and vertical fields of view. Timing points are determined by tagged instances of the system's running atomic clock. The background of the sensing volume is modeled by allowing 20 seconds of recording with no foreground image within the camera's field of view, begun via manual input after the determination of system test-readiness. The system will determine the background variation via bimodal distribution constructed from order statistics of background values during the 20-second period. The background scene is modeled by representing each pixel with three values: its minimum intensity value; it's maximum intensity value; and the maximum intensity difference between consecutive frames observed during this period. Even if there are slightly moving objects during this period, the moving pixels are distinguished from the stationary ones. Only the stationary pixels are processed to construct the initial background model. For all subsequent frames of test session data, the scene within the camera's field of view is statistically compared to the initial background model. During this modeling period, distance information from the scene is taken to construct an image blob-matching analysis baseline. Based on continuous information provided from the distance sensor and known positions within the camera's field of view, the high-speed application accounts for size variances of respective athletes.

Figure 12:
FIG. 12 is a graphical depiction of the binary blob function applied to the foreground scene prior to sprint motion.

After the 20-second learning period, the athlete in the starting position will be considered the image of interest and will create the foreground of the viewing area. A single image-blob model, as shown in FIG. 12, is applied to the background model to systematically determine the posture of athlete. The blob model is a binary replica of the average athlete at 6"1' and 210 pounds in the generally accepted three-point starting-stance position viewed at the motion camera's initial starting angle and distance. The blob-to-foreground comparison analysis allows for variations of the athlete's size and relative movement while prohibiting athletes from taking a running or standing start.

Figure 11:
FIG. 11 is a view of the major axes applied to the athlete prior to sprint action.

By fitting the binary constructed blob into the foreground image, the system then determines a major axis of the foreground region and an image centroid, shown in FIG. 11. From said centroid, major axis, and applied relative distances of the extremities to the centroid, the foreground region is used to compute the orientation of the rest of the athlete's body parts. From human extremity—body position relational analysis, the location of the subject's feet, hands, torso, and head are determined. Given the generally accepted three-point starting stance, an athlete of 6"1' and 210 pounds, one static camera at vertical height of 3 feet, the center of mass/gravity at X=0; Y=0; and 21 feet (7 yards) in perpendicular horizontal distance from the subject's starting position, the down hand of a right-handed subject viewed from left side of said athlete will be within the lower (−X, −Y) quadrant, with front foot slightly trailing the down hand in the (−X, −Y) quadrant. The back foot would represent foreground image section in the extreme end of the (+X, −Y) quadrant. The head of the subject will be represented as the protruding section along the X-axis.

Figure 13:
FIG. 13 is a graphical depiction of the application of blob perimeters on the foreground scene prior to sprint motion.

From the initial model, the segmentation analysis of the subject's body will follow the extrapolation described in the W4 method (Harwood et al[1]). Each individual segmented portion of the subject's body will be tracked after the initial learning period to determine extremity motion velocities and accelerations. The foreground boundary is defined by the extreme edges of the previously determined foreground. This static silhouette boundary perimeter, shown in FIG. 13, is used to track the periodic motion of the athlete via two-dimensional (vertical and horizontal) displacement and positional relationships of respective silhouettes over time within the projected model. The athlete's initial sprint-start directions are known and defined as positive vertical and positive horizontal vectors. A historical record of the silhouette is used to track the initial movement of the athlete in the start position. The silhouette-tracking functions will quantify slight movements that are subsequently analyzed to distinguish true versus false starts. A true start is defined as athlete movement within 0.20 seconds of down-hand surface separation where the surface separation motion is less than 5% silhouette perimeter penetration. Any movement that lasts longer than 0.20 seconds prior to down-hand surface separation or subject motion greater than 5% silhouette perimeter penetration is considered a false start. Therefore, with the implementation of the two aforementioned methods, an athlete attempting to mask his/her movement and delay detection by holding his/her down-hand on the surface will either exceed the silhouette perimeter in excess of 5% or register segmented-extremity motion velocities consistent with a sprint-start and satisfy the criteria for beginning the test timing operations.

Additionally, with the starting line sensors configured in light-operate mode, the laser beam is focused on the forward/down-hand (one that makes contact with the testing surface) of the athlete. If at any time, the laser receiver senses light, the timing clock will begin. The point at which perimeter boundary penetration exceeded 5% and the photoelectric sensors detected laser beam presence within 0.20 seconds, is the point the timing clock will begin. The point at which the athlete's motion became consistent with the determined human reaction velocity of 270 inches per second or greater constitutes a timing clock start.

Motion quantification begins with detecting motion occurring in the head-to-torso region. This can be done by comparing successive frames in the video sequence. Squared pixel differences along the horizontal axes region between two frames can be summed to obtain a measure of motion energy.

$$E = \sum_{x \in W} [I_t(x) - I_{t-1}(x)]^2$$

gives a measure (E) of motion energy derived from the intensities (I) for the pixels (x) inside the window (W) in successive frames over time (t). This general motion measure is then computed for defined directions vertical and horizontal to make the measure more selective. Start criteria is established by comparing the energy measure (E) to a motion energy threshold (T). The timing clock operation begins at E>T.

Figure 14:
FIG. 14 is a graphical view of the segmented body parts of the foreground once athlete positioning is established.
Figure 15:
FIG. 15 is a view of the athlete beginning the expected sprint motion.
Figure 16:
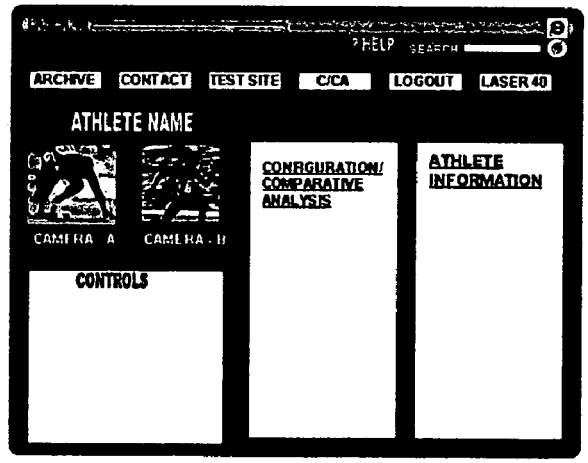
FIG. 16 is a view of the Internet site displaying the views of both test site cameras with diagnostic controls, interactive comparative analysis, and athlete information.
Figure 17:
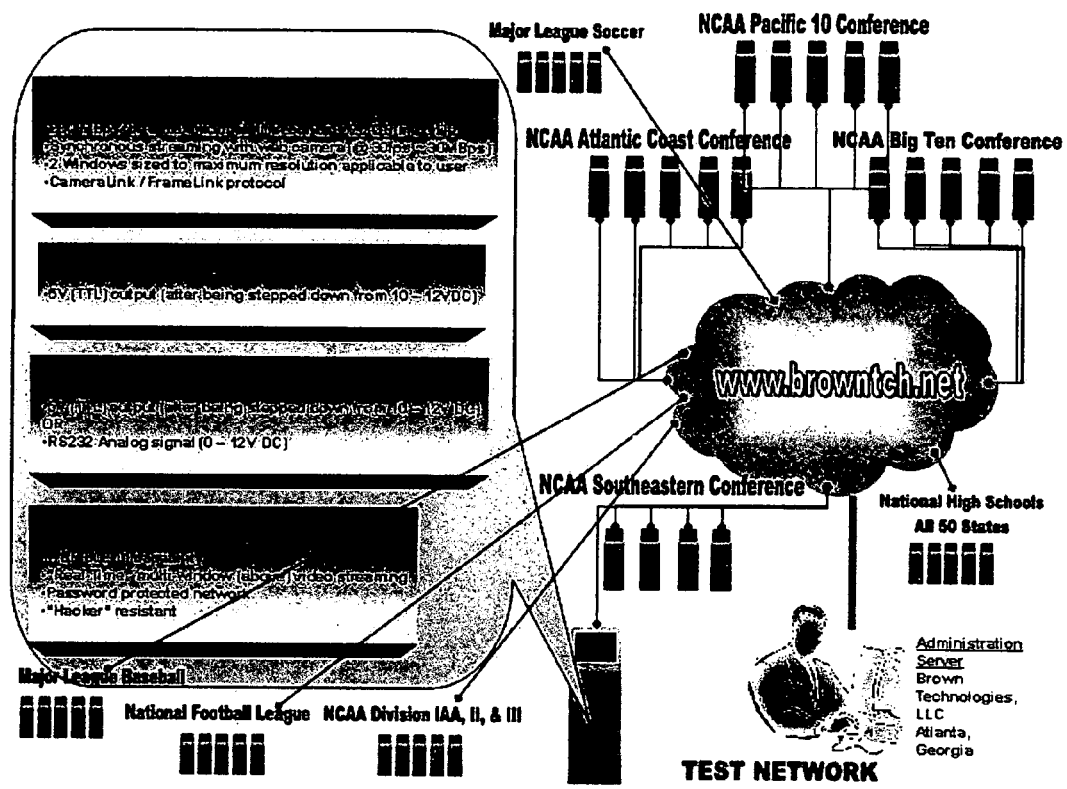
FIG. 17 is a graphical view of the national test network architecture.

The system defines "guard" regions in the image frame as silhouette-boundary exaggerations around the image of the athlete using an interface. These regions are illustrated as "G1 and G2" in the FIG. 14. These guard regions are monitored using the identical procedure as for hand motion detection above. Sprinting motion is validated as the detection of motion in successive guard regions (i.e. G1, G2, etc.). G1 is defined as the silhouette boundary representing a 5% exaggeration of the foreground-image blob, and G2 is defined as the larger volume perimeter.

The overall operation of the sprint start estimator is as follows:

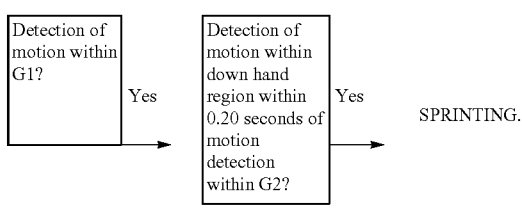

Given an extracted blob, the sprint motion detection quantification is also simultaneously calculated by monitoring the centroid of the blob. Consistent horizontal motion of the centroid is likely to coincide with sprinting motion.

Once the athlete's start has been determined, an identical set of photoelectric sensors, placed at a height determined to quantify the athlete's position, are activated to create the laser-lined path that the athlete passes through; to determine specific beam interruptions at specified distances from the starting line. The laser-lined path is created by deflecting the beam in 90 degree angles at specified distances from the starting line via reflective agents.

The beam interruption data representing the athlete's physical position over time during the test session is processed via tab and/or space delimited text time-tagged data and stored. At the conclusion of the test session, all time-tagged data is processed to determine the athlete's velocity, acceleration and displacement over time as well as overall test time. Due to the resolution of the photoelectric laser sensors, as many as four beam interruptions per laser-lined physical distance from the starting area can be expected. With athletes moving at an average velocity of 8.800 yards per second and the laser detection as responsive as 5 milliseconds, there exists the high probability of multiple beam break detections at each defined distance split:

Athlete moving at a rate of 8.800 yards per second=26.4 feet per second.
Body part potentially breaking the laser beam averages 6 inches in physical horizontal width.
Laser sensor resolution is 0.005 seconds.
(0.005 seconds per detection)×26.4 feet per second=0.132 feet/detection.
0.5 feet/(0.132 feet/detection)=3.7878 detections Thus, The athlete's time at the specified distance is defined as the time of beam detection at the beginning of the longest time-span at which the laser receiver did not report beam sensing.

At the conclusion of the testing event, the data, with accompanying video is temporarily stored within the systems' computing component and transferred to the remote server database upon acceptance of said test results. Data will not be stored, unless as a result of direct action of the end user. Data is then formatted and filed to be compared with data of like criteria, customized and determined by the end user. Automated graphical and charting tools would encompass 1:1 ratio-matching properties interactively viewed during all applicable testing operations. Many existing database front-end software packages possess the capability to achieve the aforementioned goal. All functions are operated directly through the secured Internet access of the respective test system's IP address. This provides all authorized end users the ability to view all testing session, and operations real-time and with documented and stored video confirmation.

The graphic user interface is an easily navigated intuitive control system with touch-screen controls for ease of outdoor operation. Via proven HTTP, SMTP and FTP protocol the secure test network is established through a central world wide web location and integrated server.

Having thus described the preferred embodiment of the invention, those skilled in the art will readily recognize various modifications and changes that may be made to the present invention without departing from its scope and spirit.

What is claimed is:

1. A method for evaluating the performance of athletes, the method comprising the steps of:
creating a laser grid by producing a laser beam with a laser beam emitter and using reflective agents to deflect said laser beam [into 90 degree angles] between the laser beam emitter and a laser beam receiver, to form a laser beam grid;
capturing and transmitting movements of a person using a first camera for detecting an initial movement of said person and a second camera for monitoring movement over a specified range;
measuring velocity of said person by detecting each time a beam in said laser beam grid is broken;
measuring the speed at which said person travels between predetermined locations by using said laser beam grid and said first and second cameras;
measuring the distance between said predetermined locations using a distance sensor;
and modeling a background by recording with no foreground image, followed by using the person to create a foreground image to determine a true start of the person;
wherein the true start is defined by the movement of said person within a predetermined time of a starting position.

2. The method claimed in claim 1, wherein one of said first and second cameras is a high-speed motion camera, and wherein said capturing and transmitting said movements of said person begins upon said initial movement of said person.

3. The method claimed in claim 1, wherein data of said movements is transferred to a remote server by video streaming and accessible via an Internet Protocol address.

4. The method claimed in claim 1, wherein said starting position is a down-hand surface separation.

5. A system for measuring an athlete's performance comprising:
a laser beam emitter configured to create a laser beam;
a laser beam receiver configured to receive the laser beam created by the laser beam emitter;
a plurality of reflective agents positioned between said laser beam emitter and said laser beam receiver to form a laser beam grid;
a first camera configured to record a background with no foreground image for measuring against a silhouette of the athlete to determine a true start;
a second camera configured to operate in conjunction with the first camera and laser beam grid to determine the movement of the athlete over a specified range;
a distance sensor for measuring the distance between predetermined locations.

* * * * *